(12) United States Patent
Akiyama et al.

(10) Patent No.: US 6,795,016 B2
(45) Date of Patent: Sep. 21, 2004

(54) JIG FOR HEAT TREATMENT OF WORK

(75) Inventors: Masaaki Akiyama, Suntou-gun (JP);
Akira Ogishima, Tagata-gun (JP);
Kazumasa Sugiyama, Numazu (JP);
Koichi Sakamoto, Suntou-gun (JP);
Kazumi Matsumoto, Numazu (JP)

(73) Assignee: Usui Kokusai Sangyo Kaisha, Ltd., Shizuoka-ken (JP)

( * ) Notice: Subject to any disclaimer, the term of this patent is extended or adjusted under 35 U.S.C. 154(b) by 0 days.

(21) Appl. No.: 10/363,178
(22) PCT Filed: Sep. 6, 2002
(86) PCT No.: PCT/JP02/09116
§ 371 (c)(1),
(2), (4) Date: Mar. 6, 2003
(87) PCT Pub. No.: WO03/027336
PCT Pub. Date: Apr. 3, 2003

(65) Prior Publication Data
US 2003/0180677 A1 Sep. 25, 2003

(30) Foreign Application Priority Data
Sep. 7, 2001 (JP) .................................. 2001-272596

(51) Int. Cl.[7] .................................................. C21D 9/00
(52) U.S. Cl. .................. 342/261; 432/253; 432/258
(58) Field of Search .............................. 432/261, 258, 432/259, 253; 269/43

(56) References Cited

U.S. PATENT DOCUMENTS

| 3,498,597 | A | | 3/1970 | Roberts et al. | |
|---|---|---|---|---|---|
| 4,008,997 | A | * | 2/1977 | Krasl | 432/258 |
| 4,290,753 | A | * | 9/1981 | Klefisch | 432/261 |
| 4,315,737 | A | * | 2/1982 | Elliott et al. | 432/241 |
| 4,463,864 | A | * | 8/1984 | Roach | 220/4.34 |
| 5,752,821 | A | | 5/1998 | Jo | |
| 6,454,564 | B2 | * | 9/2002 | Ricchio et al. | 432/261 |
| 6,497,330 | B1 | * | 12/2002 | Van Der Linden et al. | 211/133.6 |

FOREIGN PATENT DOCUMENTS

| DE | 3317173 A1 | * | 11/1984 |
|---|---|---|---|
| JP | 57-15013 | | 3/1982 |
| JP | 58-46113 | | 10/1983 |
| JP | 2779467 | | 7/1998 |
| JP | 2000-169910 | | 6/2000 |
| JP | 2002-194423 | | 7/2002 |

* cited by examiner

*Primary Examiner*—Jiping Lu
(74) *Attorney, Agent, or Firm*—Jordan and Hamburg LLP

(57) ABSTRACT

A jig for heat treatment of a workpiece capable of use over a long period of time by minimizing or eliminating deformation thereof caused by thermal distortion and which is capable of performing heat treatment of the workpiece by reducing the amount of heat energy absorbed by the jig in a heat-treatment furnace. The jig includes an outer peripheral frame formed by a plurality of members and a mounting portion arranged inside the outer peripheral frame and also formed by a plurality of members. The workpiece rests on the mounting portion during use. The members of the outer peripheral frame and mounting portion are movably connected to each other with an expansion space being provided between each adjacent member capable of absorbing thermal expansion of the member during thermal treatment.

20 Claims, 4 Drawing Sheets

JIG FOR HEAT TREATMENT OF WORK

BACKGROUND OF THE INVENTION

1. Field of the Invention

This invention relates to a thermal processing jig for thermally processing a workpiece placed on a top surface thereof. More particularly, this invention is used as a jig for connecting plural members by brazing or the like, in which the plural members are connected by disposing brazing material at connecting portions between the plural members serving as a workpiece; then by mounting the workpiece applied with the brazing material on a top surface of the jig, then by placing the workpiece into a high temperature furnace, and then by melting the brazing material. This invention is also used as a jig for thermally processing plural workpieces coated with surface treatment material, e.g., thermosetting coating, in which the workpieces are thermally processed by mounting the workpieces on a top surface of the jig, and then by disposing the workpieces for a prescribed period into a high temperature furnace for heating the workpieces to a prescribed temperature.

2. Description of Related Art

In a conventional thermal processing jig, for example, a jig 20 shown in FIG. 4 including an outer peripheral frame 21 for structuring the jig 20, a mounting portion 22 for mounting a workpiece thereon, and a stay 24 is formed rigidly by employing thick members and by fixedly connecting the members with welds 23. In a case where the jig 20 having a workpiece mounted thereon is placed into a furnace, high-temperature heat causes thermal stress upon the jig 20, and often results in deformation of the jig 20. Therefore, in order to prevent deformation of the thermal processing jig, thick members are used for forming the jig rigidly.

Since the members of the rigidly formed jig are heated up from a cold state in a frequent and repetitive manner, then exposed to a high temperature atmosphere of 1100° C. or more inside a furnace, and then cooled to a cold state, the members are subject to considerable deformation caused by welding stress in a manufacturing process and internal stress from the property of the material due to heat difference between the heating process and the cooling process. In association with the deformation of the members, the workpiece mounted on the top surface of the mounting portion will also deform. Accordingly, a subsequent process of inspecting all products and an additional process of relieving the stress are necessary for products requiring accurate dimensional tolerance.

Forming the thick and rigid jig causes the jig to become heavy. Therefore, the weight of the jig itself will take up a large portion of the entire weight in processing with the furnace. That is, absorption of thermal energy by the jig has no significance from an aspect of heating energy. Most preferably, heating energy should only be applied upon the workpiece disposed inside the furnace. However, in reality, a considerable amount of heat is absorbed by the conventional rigid jig in a case where the jig and the workpiece are placed in a same atmosphere of high temperature. Therefore, a large space for a heating zone of the furnace and a long time for the heating process are required for the conventional jig. At the same time, since the jig has large thermal capacity, the jig is difficult to cool into a cold state. Therefore, a large space for a cooling zone when using a continuous thermal processing furnace and a long time for a cooling process are required for the jig. Repetitively using the jig for a numerous amount of times causes considerable thermal stress and results in considerable deformation, even to the rigidly formed jig. The thermally deformed jigs were disposed of since the jigs were difficult to be reused. Not only is the jig used for a short period, but is also unable to use thermal energy efficiently due to the large amount of heat absorption of the jig. Therefore, a large sized furnace and high running cost was necessary for the conventional jig.

It is an object this invention to solve the foregoing problems by providing a jig causing no or hardly any deformation from thermal stress upon the jig in a case where the jig is disposed into a thermal furnace along with a workpiece, thereby allowing the jig to be used for a period considerably longer than the conventional jig. By forming a thin and light-weight jig, the productivity for the operator can be increased, the amount of heat absorption of the jig placed inside a furnace can be reduced to enable a more efficient thermal processing of a workpiece, and the apparatus for thermal processing can be size-reduced to enable reduction in initial cost and running cost.

SUMMARY OF THE INVENTION

This invention provides a thermal processing jig for a workpiece including: an outer peripheral frame formed of a plurality of members; and a mounting portion arranged within the outer peripheral frame for mounting the workpiece, wherein the outer peripheral frame and the mounting portion are movably connected, wherein the plurality of members forming the outer peripheral frame are connected via an expansion space capable of absorbing expansion caused during thermal expansion of the outer peripheral frame and the mounting portion, and wherein the plurality of members forming the outer peripheral frame and a member constituting the mounting portion are connected via the expansion space.

This invention can also provide a thermal processing jig for a workpiece, wherein the outer peripheral frame and the mounting portion are movably connected by piercingly forming an insertion aperture at a connecting portion between the outer peripheral frame and the mounting portion, and by inserting the connection axis through the insertion aperture, for enabling each member of the outer peripheral frame and the mounting portion to move at the connection portion during thermal expansion of the outer peripheral frame and the mounting portion, wherein the insertion aperture is formed for inserting the connection axis therethrough, and wherein the connection axis has a diameter smaller than the insertion aperture.

This invention can also provide a thermal processing jig for a workpiece, wherein the plurality of members forming the outer peripheral frame are directly connected to each other, and wherein the plurality of members forming the outer peripheral frame and the mounting portion are directly connected.

This invention can also provide a thermal processing jig for a workpiece, wherein the plurality of members forming the outer peripheral frame are connected to each other via an intermediary attachment member, and wherein the plurality of members forming the outer peripheral frame and the mounting portion are connected via the intermediary member.

This invention can also provide a thermal processing jig for a workpiece, wherein the connection axis is removably connected to the insertion aperture.

This invention can also provide a thermal processing jig for a workpiece, wherein the connection axis is unremovably connected to the insertion aperture.

This invention can also provide a thermal processing jig for a workpiece, wherein the mounting portion is formed with a plurality of members.

This invention can also provide a thermal processing jig for a workpiece, wherein the mounting portion is formed from a single connected member or a single united bodied member.

With this invention, a workpiece targeted for thermal processing is mounted on a top surface of a mounting portion of a jig, and the jig having the workpiece mounted thereon is disposed into a thermal furnace. The workpiece is heated inside the thermal furnace and thermally processed, e.g., brazed, while the thermal energy is inevitably absorbed by the jig. The heating cause thermal expansion upon the members forming the jig. Despite the thermal expansion caused upon the members, each member is movably connected; furthermore, expansion spaces for absorbing the expansion of the members are formed between the members of the outer peripheral frame and also between the outer peripheral frame and the mounting portion.

The expansion spaces formed between the members therefore absorbs the expansion from the thermally expanded members, as opposed to a conventional example where members of a jig such as an outer peripheral frame and a mounting portion for mounting a workpiece are firmly connected by welding or the like. Each member, along with the expansion absorption of the expansion spaces, can absorb the stress created in association with the thermal expansion since each member is movably connected. Accordingly, the expansion spaces can therefore absorb the expansion, from the thermally expanded members, as opposed to a conventional example where members of a jig such as an outer peripheral frame and a mounting portion for mounting a workpiece are firmly connected by welding or the like.

Stress and deformation upon the jig as well as deformation of the workpiece from the stress of the jig can be prevented since the members are able to absorb the thermal expansion. Since deformation and thermal stress upon the jig can be prevented, the jig is not required to be formed rigidly, but is instead able to be formed only with strength sufficient for handling or mounting the workpiece. Accordingly, the members of the jig can be formed with a thin thickness, so that the thermal energy absorbed by the jig can be absorbed to an amount considerably less than that of the conventional jig. Accordingly, unnecessary absorption of thermal energy can be prevented and thermal processing of the workpiece can be provided efficiently. Consequently, the space for a heating zone inside a furnace and the time for heating can be reduced. At the same time, the jig having little thermal capacity is easy to cool into a cold state, thereby requiring less space for a cooling zone than the conventional jig in a case where a continuous thermal processing furnace is used and also requiring less time for a cooling process.

Each member is movably connected via an expansion space. In movably connecting the members, an insertion aperture is piercingly formed at a connecting portion of each member for inserting therethrough a connection axis, in which the connection axis having a smaller diameter than the insertion aperture is pierced therethrough. Forming the connection axis with a smaller diameter than the insertion aperture allows a play portion to be created in the insertion aperture. The play portion enables the members to move in association with the thermal expansion of the members.

Although the members of the jig include plural members forming the outer peripheral frame and the mounting portion arranged inside the outer peripheral frame for mounting the workpiece, the members can be directly connected via the insertion aperture and the connection axis, or connected via an intermediary attachment member. By connecting the members via the intermediary attachment member, the forming of the members of the jig can be simplified, thereby providing productivity and versatility for the jig.

In connecting the members directly, the members of the jig will be subject to a process such as bending. Therefore, direct connection of the members has a drawback of requiring more labor in processing the members of the jig. Nevertheless, direct connection of the members can simplify manufacture of the jig since no intermediary attachment member is required. Therefore, connection of the members can be determined according to the purpose for processing the workpiece. By forming the connection axis in a removable manner with respect to the insertion aperture, the connection axis can be removed from the members for allowing the members to be modified by pressing or the like. For example, a jig deformed into a wound state can be flattened and reused as a thermal processing jig. As opposed to the conventional jig, the jig of this invention will rarely be required to be discarded.

A considerable amount of thermal expansion can be absorbed even for a large sized mounting portion and thermal stress can be prevented by forming the mounting portion with plural members connected movably via the expansion space.

In a case where the jig is of a small size area, the mounting portion can also be formed from a single connected or united bodied member since the amount of thermal expansion is small and the expansion space formed between the mounting portion and the outer peripheral frame will be able to absorb the thermal expansion, thereby forming the jig with a simple structure and enabling manufacture of an inexpensive product.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF THE PREFERRED EMBODIMENTS

Figure 1:
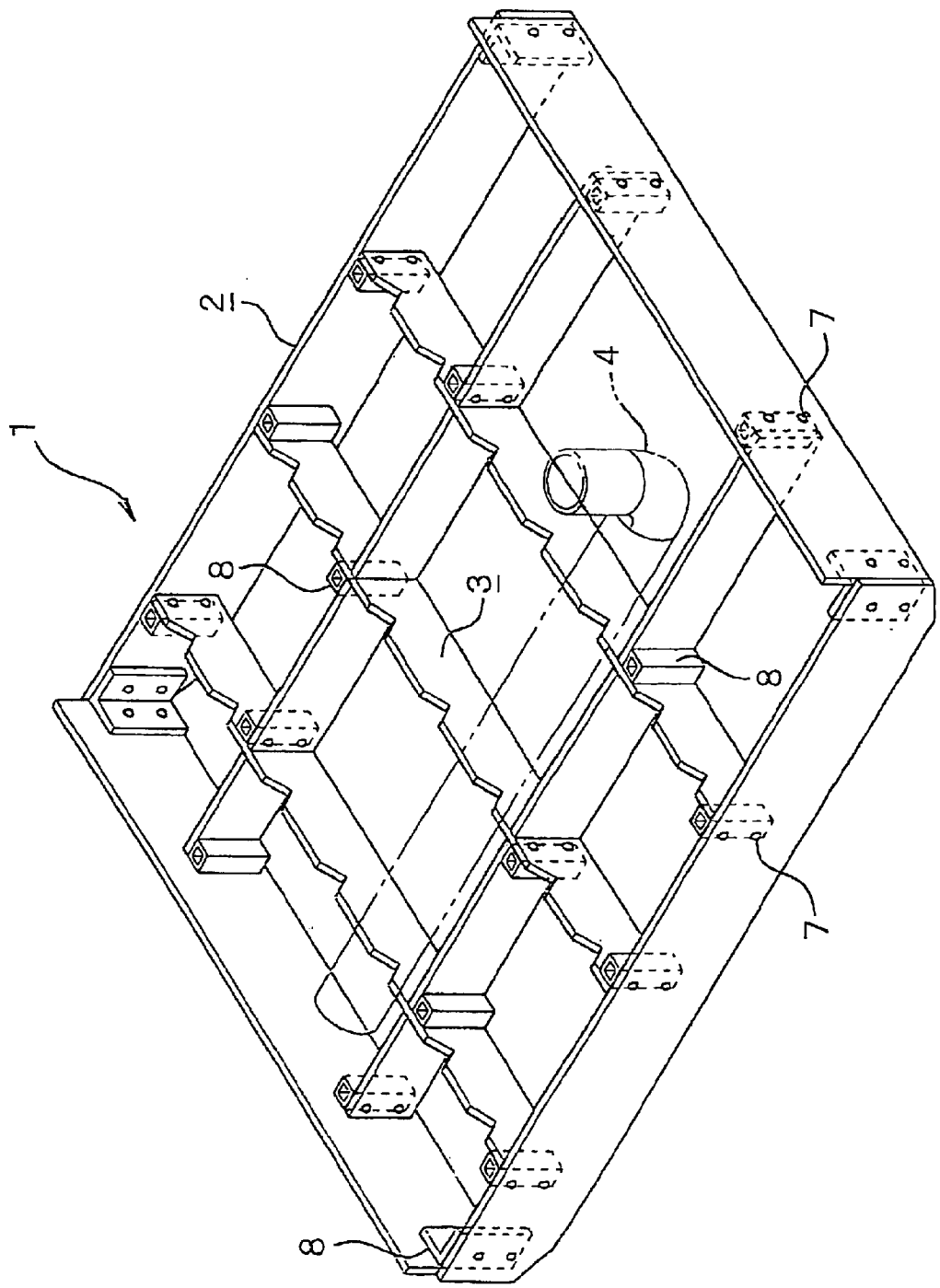
FIG. 1 is a perspective view showing a first embodiment.

An embodiment of this invention will hereinafter be described with reference to the drawings. Numeral 1 is a jig for thermal processing having an outer peripheral frame 2 formed of plural members and a mounting portion 3 formed of plural members arranged inside the outer peripheral frame 2. A top surface of the mounting portion 3 is formed for mounting thereon a workpiece 4 targeted for thermal processing and is processed suitably according to the workpiece 4. The processing differs according to the object targeted as the workpiece 4 for thermal processing. For example, the top surface of the mounting portion 3 can be formed with irregularities, or with projecting support columns (not shown) for mounting and maintaining the workpiece 4. The workpiece 4 for thermal processing can be of various kinds. For example, a workpiece 4 having brazing material disposed in between connecting portions of plural members of the jig 1 for connecting the plural members, a workpiece 4 for annealing or the like, a workpiece 4 for surface drying, or a workpiece for other thermal processing of preference.

The jig 1 for thermal processing comprises the outer peripheral frame 2 having a square shape or a rectangular shape. The outer peripheral frame 2 is comprised not of a single member but of a plurality of members. In an inner space of the outer peripheral frame 2, the mounting portions 3 for mounting the workpiece 4 on the top surface thereof are disposed with a prescribed space therebetween. The mounting portion 3 is formed with a shape in accordance with the purpose for mounting the workpiece 4 targeted for thermal processing.

The plural members comprising the outer peripheral frame 2 and the mounting portion 3 are connected via an expansion space 5 capable of absorbing the expansion of the members during thermal expansion. The expansion space 5 should preferably be formed with a space of 1 mm to $\frac{1}{100}$ mm. An expansion space 5 over 1 mm causes shakiness of the jig 1, decline of precision, and unstableness when the workpiece 4 is mounted. An expansion space 5 below $\frac{1}{100}$ mm cannot absorb the thermal expansion and contraction of the members due to mutual interference, thereby causing deformation. Various methods can be employed for forming the expansion space of 1 mm to $\frac{1}{100}$ mm between the members, such as by connecting each of the members via a spacer 9 having a thickness equal to a prescribed space of the expansion space 5, and then by removing the spacer 9 after the connection.

Insertion apertures 6 are formed in the connecting portion between the plural members of the outer peripheral frame 2 and the plural members of the mounting portion 3. The insertion aperture 6 has a connecting axis 7 formed therethrough for connection between the outer peripheral frame 2 and the mounting portion 3, between the outer peripheral frame 2 and the outer peripheral frame 2, or between the mounting portion 3 and the mounting portion 3.

In one embodiment, the insertion aperture 6 is formed with a size of 3.3 mm, and the connecting axis 7 inserted through the insertion aperture 6 is formed with a 3.2 mm diameter. The connecting axis 7 is formed as a rivet having engagement heads on both ends thereof, wherein the diameter difference between the insertion aperture 6 and the connecting axis 7 is 0.1 mm. A large difference in diameter causes problems such as shakiness of the members comprising the jig 1, or deformation of the workpiece 4 when the workpiece 4 is mounted. A small difference in diameter between the diameter of the insertion aperture 6 and the connection axis 7 causes disability in adjusting to the movement from the expansion of the members.

Figure 2:
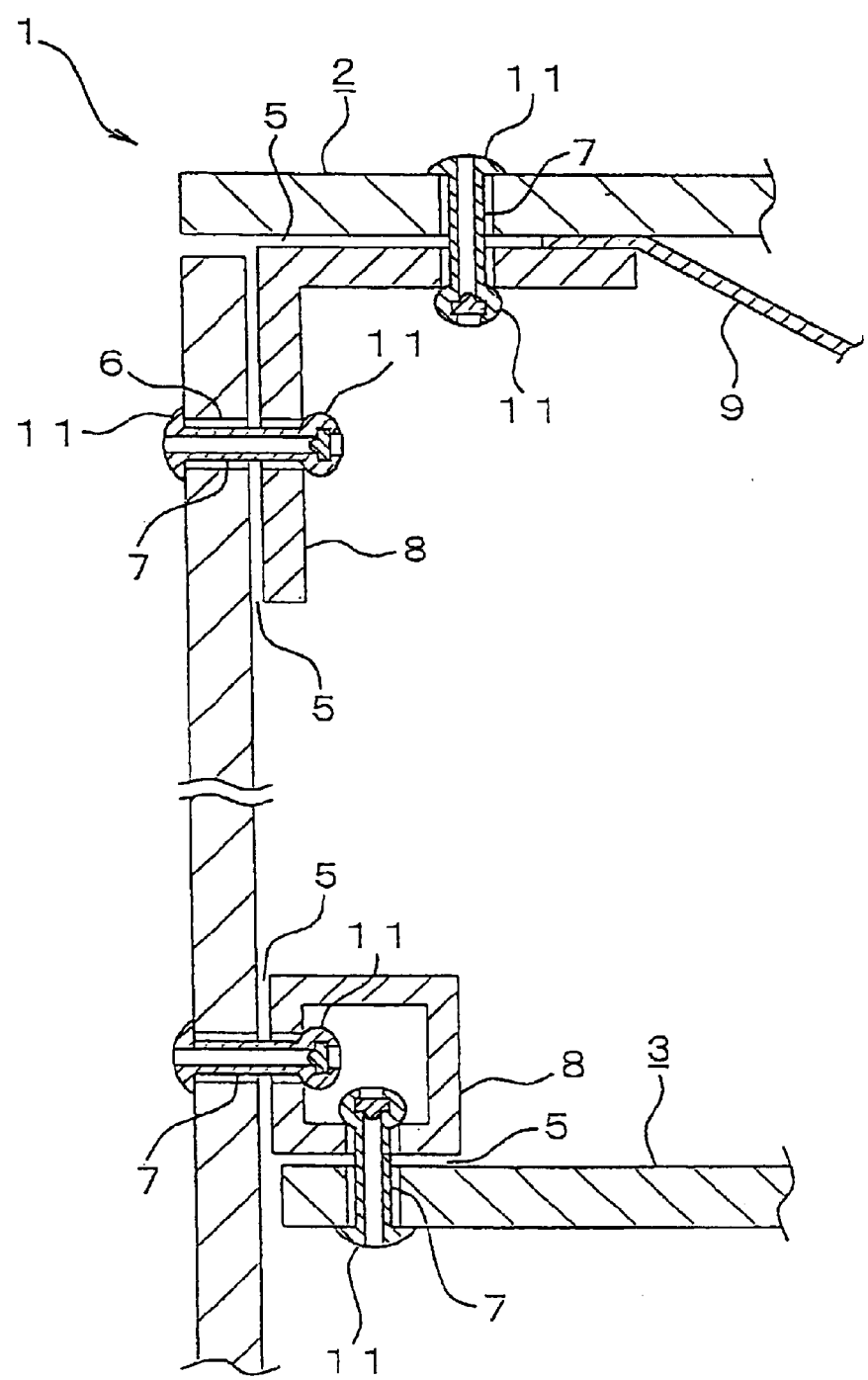
FIG. 2 is an enlarged cross-sectional view showing a connecting relation between an insertion aperture and a connection axis.

Accordingly, the diameter difference between the insertion aperture 6 and the diameter of the connecting axis 7 in one embodiment should preferably be ranged between approximately 0.2 mm to $\frac{1}{100}$ mm. Such diameter difference, together with the expansion space 5, serves to absorb the expansion of the members during thermal expansion. Problems such as shakiness of the jig 1 in an unheated state can be restrained to a minimal degree, the workpiece 4 can be mounted on the top surface with more precision, and unstableness of the mounted workpiece 4 can be eliminated. Each of the members can be connected by using an intermediary attachment member 8 of an L-shaped angle or a rectangular pipe as shown in FIG. 2. For example, in using the intermediary attachment member 8 of an L-shaped angle as shown in FIG. 2, the intermediary attachment member 8 of an L-shaped angle can be arranged in a corner portion of the outer peripheral frame 2 of the jig 1. The insertion aperture 6 is piercingly formed in the intermediary attachment member 8 and the outer peripheral frame 2, and the connecting axis 7 formed as a rivet is inserted through the piercingly formed insertion aperture 6, thereby enabling connection in the corner portion of the outer peripheral frame 2 via the intermediary attachment member 8.

Needless saying, each of the members connected by the connection axis 7 have the expansion space 5 of approximately 1 mm to $\frac{1}{100}$ mm disposed therebetween. In forming the expansion space 5 as shown in FIG. 2, the spacer 9 having a thickness of approximately 1 mm to $\frac{1}{100}$ mm is inserted between the members, and the members are then connected by the connection axis 7. The spacer 9 is removed after the members are connected by the connection axis 7, thereby forming the expansion space 5 and completing the connection of the members.

As shown in the bottom portion of FIG. 2, an intermediary attachment member 8 of a rectangular pipe is used. Although the insertion aperture 6 and the connection axis 7 are also formed in such a case, the intermediary attachment member 8 of a rectangular pipe is convenient for mounting the workpiece 4 on the mounting portion 3 inside the outer peripheral frame 2. Spaces of approximately 1 mm to $\frac{1}{100}$ mm are formed between the intermediary attachment member 8 and the mounting portion 3 and also between the intermediary attachment member 8 and the outer peripheral frame 2 for enabling absorption of deformation caused by the thermal expansion of the intermediary attachment member 8, or the members of the outer peripheral frame 2, the mounting portion 3, etc. A stainless plane material, for example, can be used for forming the intermediary attachment member 8, the outer peripheral frame 2, the mounting portion 3 or the like, in which the plane thickness in this embodiment is 2 mm.

Figure 3:
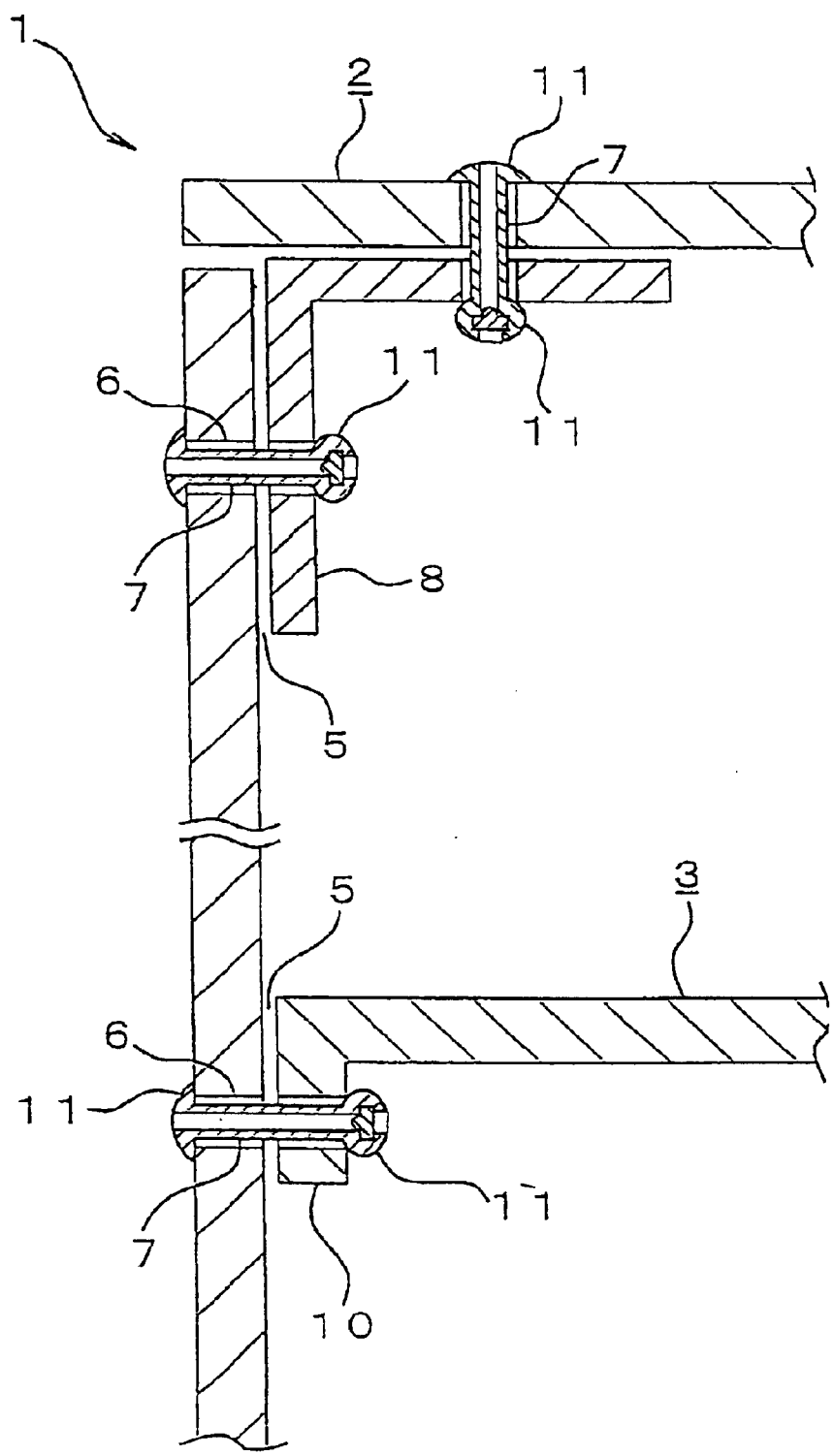
FIG. 3 is an enlarged cross-sectional view showing a state where mounting portion is directly connected to an outer peripheral frame.
Figure 4:
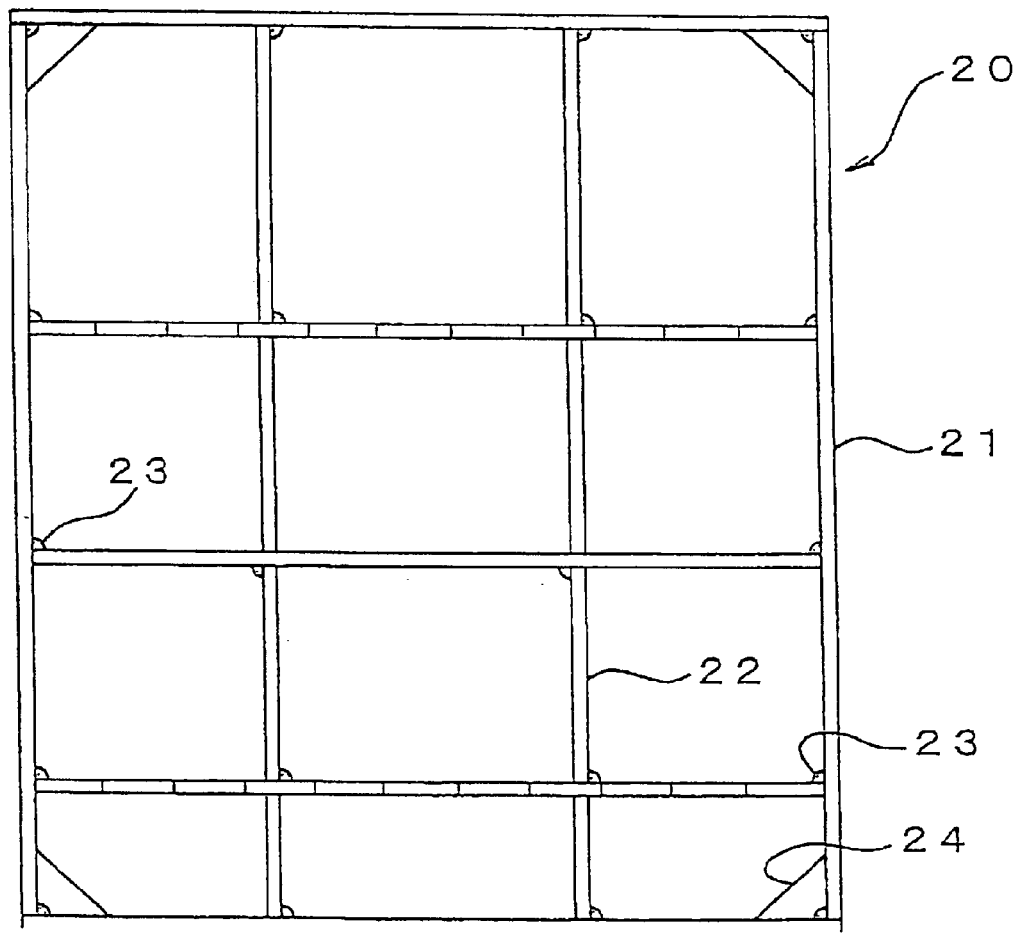
FIG. 4 is a plan view showing a conventional example.

Although the intermediary attachment member 8 is used for connecting the outer peripheral frame 2 and the mounting portion 3 in the foregoing embodiment, the outer peripheral frame 2 and the mounting portion 3 can be connected directly without use of the intermediary attachment member 8 as in this embodiment shown in the bottom portion of FIG. 3. In such a case, an L-shaped bent portion 10 is formed at an end portion of the mounting portion 3, and the insertion aperture 6 is formed in the mounting portion 3, thereby allowing the connection axis 7 to be inserted through the insertion aperture 6. Although this embodiment has an advantage of requiring no intermediary attachment member 8, the L-shaped bent portion 10 is required to be formed for opening the insertion aperture 6 in the end portion of the mounting portion 3, thereby requiring additional labor in forming the members. Nevertheless, the weight of the jig 1 can be lightened, the thermal capacity and the thermal energy of the jig 1 can be reduced, and the jig 1 can be cooled faster by not requiring the intermediary attachment member 8.

Although the thickness for the outer peripheral frame 2 and the mounting portion 3 is 2 mm in the foregoing embodiment, the thickness is not to be restricted to 2 mm. The thickness can also be approximately 1 mm or 0.5 mm. The thickness can be determined according to the weight of the workpiece 4 targeted for mounting on the top surface, or the purpose of mounting the workpiece 4. The thickness can be formed to a degree capable of preventing deformation of the jig 1 when held or transported in an ordinary procedure performed by an operator handling the workpiece 4. An ideal jig 1 is one resistant to deformation from external force and thus formed with a thin thickness without adversely affecting the mounting of the workpiece 4. Forming a thin jig 1 not only allows the jig 1 to be lightened and transported easily, but also reduces the absorption amount of thermal energy of the jig 1 when placed into a high temperature furnace. Since the thermal energy unabsorbed by the jig 1 can be added to the workpiece 4, the jig 1 placed in the furnace 1 can be moved faster for enabling the workpiece 4 to be thermally processed efficiently. Forming the jig 1 with a thin thickness, however, causes the jig 1 to have a sharp property. Therefore, it is required to keep in mind that the sharp property of the jig 1 may, for example, cut the operator in a case where the jig 1 is hand-held.

Although the connection axis 7 is formed with use of a rivet in the foregoing embodiments, the connection axis 7 can also be formed with, for example, a bolt and a nut. Productivity may slightly be lower when using a bolt and a nut instead of using a rivet. The connection axis 7 can be formed firmly and can also be formed in an unremovable state with respect to the insertion aperture 6.

Thus structured, thermal energy can be applied to the workpiece 4 and the jig 1 by mounting the workpiece 4 targeted for thermal processing on the top surface of the jig 1 and then by placing the jig 1 into a high temperature furnace. The thermal processing is performed according to the purpose of the workpiece 4. Although the heat from thermal processing causes thermal expansion in each member of the jig 1, the thermal expansion is absorbed by the expansion space 5. The movement of the members during the absorption of thermal expansion by the expansion space 5 will be no problem since each member is connected movably.

In connecting the members via the connection axis 7 and the insertion aperture 6, a gap of a certain extent is formed between the connection axis 7 and the insertion aperture 6 since the connection axis 7 inserted into the insertion aperture 6 has a smaller diameter than that of the insertion aperture 6. Accordingly, each of the members of the jig 1 can expand within the extent of the gap, respectively. Therefore, the thermal expansion can be absorbed by each member of the jig 1, and problems such as bending or deforming can be prevented. Since problems such as bending and deforming can be prevented, the jig 1 can be formed with no requirement of a rigid body structure for preventing deformation and can also be formed with a thin thickness for absorbing less thermal energy than the conventional product. More thermal energy can be applied to the workpiece 4 per unit of time, thereby the workpiece 4 inside the furnace can be moved at a higher speed for enabling quick thermal processing of the workpiece 4.

In a case where the connection axis 7 is formed in a removable manner, the members of the jig 1 can be disassembled, restored into original form by pressing or the like, and reassembled for further use. Therefore, the members of the jig 1 can be economically restored and repaired even when slight deformation or the like is caused upon the workpiece 4 by long term use or by external impact or the like during handling of the workpiece 4. Forming the connection axis 7 in a removable manner with respect to the insertion aperture 6 is not to be restricted to a typical method such as using a bolt and a nut. A rivet or the like can also be employed for connection as long as disassembly is possible.

Although the mounting portion 3 is formed from plural members in the foregoing embodiments, the mounting portion 3, in a case where the jig 1 has a size of a small area, can also be formed from a single connected or united bodied member since the amount of thermal expansion is small and the expansion space 5 formed between the mounting portion 3 and the outer peripheral frame 2 can absorb the thermal expansion. Accordingly, the mounting portion 3 for a small sized jig 1 can be formed with a single member, thereby allowing the jig 1 to have a simple structure and enabling manufacture of an inexpensive product.

Thus structured, no or hardly any deformation is caused from thermal stress of the jig with this invention, thereby allowing the jig to be used for a long period. Since the workpiece mounted on the jig will not be subject to deformation in association with the thermal stress of the jig, procedures such as modifying the workpiece after the thermal processing of the workpiece will not be required, thereby enabling economical and precise thermal processing of the workpiece.

What is claimed is:

1. A thermal processing jig for a workpiece comprising:
an outlet peripheral frame formed of a plurality of members movably connected to one another, the members including an insertion aperture at a connecting portion proximate each adjacent one of the members;
a connection axis arranged in each of the insertion apertures for enabling each member to move at the connection portion during thermal expansion of the members, the connection axes having a diameter smaller than a diameter of the insertion apertures; and
a mounting portion arranged within and movably connected to the outer peripheral frame for mounting the workpiece, the plurality of members forming the outer peripheral frame being connected to each other and to the mounting portion via an expansion space capable of absorbing expansion caused during thermal expansion of the outer peripheral frame and the mounting portion.

2. The thermal processing jig for a workpiece according to claim 1, wherein the plurality of members forming the outer peripheral frame are directly connected to each other, and to, the mounting portion.

3. The thermal processing jig for a workpiece according to claim 1, further comprising intermediary attachment members for connecting the plurality of members forming the outer peripheral frame to each other to the mounting portion.

4. The thermal processing jig for a workpiece according to claim 1, wherein the connection axis is removably connected to the insertion aperture.

5. The thermal processing jig for a workpiece according to claim 1, wherein the connection axis is fixedly connected to the insertion aperture.

6. The thermal processing jig for a workpiece according to claim 1, wherein the mounting portion is formed with a plurality of members.

7. The thermal processing jig for a workpiece according to claim 1, wherein the mounting portion is formed from a single connected member or a single unitary member.

8. The thermal processing jig for a workpiece according to claim 1, wherein the mounting portion is formed of a plurality of members movably connected to one another.

9. The thermal processing jig for a workpiece according to claim 8, wherein the plurality of members forming the mounting portion are directly connected to each other and to the members forming the outer peripheral frame.

10. The thermal processing jig for a workpiece according to claim 8, wherein the members forming the mounting portion include an insertion aperture at a connecting portion proximate each adjacent one of the members forming the mounting portion and proximate each adjacent one of the members forming the outer peripheral frame, further comprising a connection axis arranged in each of the insertion apertures for enabling each member forming the mounting portion to move at the connection portion during thermal expansion of the members, the connection axes having a diameter smaller than a diameter of the insertion apertures.

11. The thermal processing jig for a workpiece according to claim 10, further comprising intermediary attachment members for connecting the plurality of members forming the mounting portion to each other and to the members forming the outer peripheral frame, the insertion apertures and the connection axes extending through the attachment members and the members forming the mounting portion and the outer peripheral frame.

12. The thermal processing jig for a workpiece according to claim 8, wherein the members forming the mounting portion include an insertion aperture at a connecting portion proximate each adjacent one of the members forming the mounting portion, further comprising a connection axis arranged in each of the insertion apertures for enabling each member forming the mounting portion to move at the connection portion during thermal expansion of the members, the connection axes having a diameter smaller than a diameter of the insertion apertures.

13. The thermal processing jig for a workpiece according to claim 12, wherein the members forming the mounting portion are connected to each other and to the members forming the outer peripheral frame via an expansion space capable of absorbing expansion caused during thermal expansion of the outer peripheral frame and the mounting portion.

14. The thermal processing jig for a workpiece according to claim 12, further comprising intermediary attachment members for connecting the plurality of members forming the mounting portion to each other, the insertion apertures and the connection axes extending through the attachment members and the members forming the mounting portion.

15. The thermal processing jig for a workpiece according to claim 1, further comprising intermediary attachment members for connecting the plurality of members forming the outer peripheral frame to each other, the insertion apertures and the connection axes extending through the attachment members and the members forming the outer peripheral frame.

16. The thermal processing jig for a workpiece according to claim 15, wherein adjacent ones of the members forming the outer peripheral frame are arranged perpendicular to one another and the attachment members have an L-shape.

17. The thermal processing jig for a workpiece according to claim 1, wherein the mounting portion is formed of a plurality of members movably connected to one another and to the members forming the outer peripheral frame.

18. The thermal processing jig for a workpiece according to claim 17, further comprising intermediary attachment members for connecting the plurality of members forming the outer peripheral frame to each other and to the members forming the mounting portion, the insertion apertures and the connection axes extending through the attachment members, the members forming the outer peripheral frame and the members forming the mounting portion.

19. The thermal processing jig for a workpiece according to claim 1, wherein the outer peripheral frame and the mounting portion are movably connected to one another by providing insertion apertures at connecting portions between the members of the outer peripheral frame and the mounting portion, a connection axis being arranged in each of the insertion apertures.

20. A thermal processing jig for a workpiece comprising:
an outer peripheral frame formed of a plurality of members;
a mounting portion arranged within and movably connected to the outer peripheral frame for mounting the workpiece, the plurality of members forming the outer peripheral frame being connected to each other and to a member constituting the mounting portion via an expansion space capable of absorbing expansion caused during thermal expansion of the outer peripheral frame and the mounting portion; and
intermediary attachment members for connecting the plurality of members forming the outer peripheral frame to each other and to the mounting portion.

* * * * *